F. J. VICKMAN.
CAR DOOR OPERATOR.
APPLICATION FILED JULY 17, 1915.
1,194,578.
Patented Aug. 15, 1916.
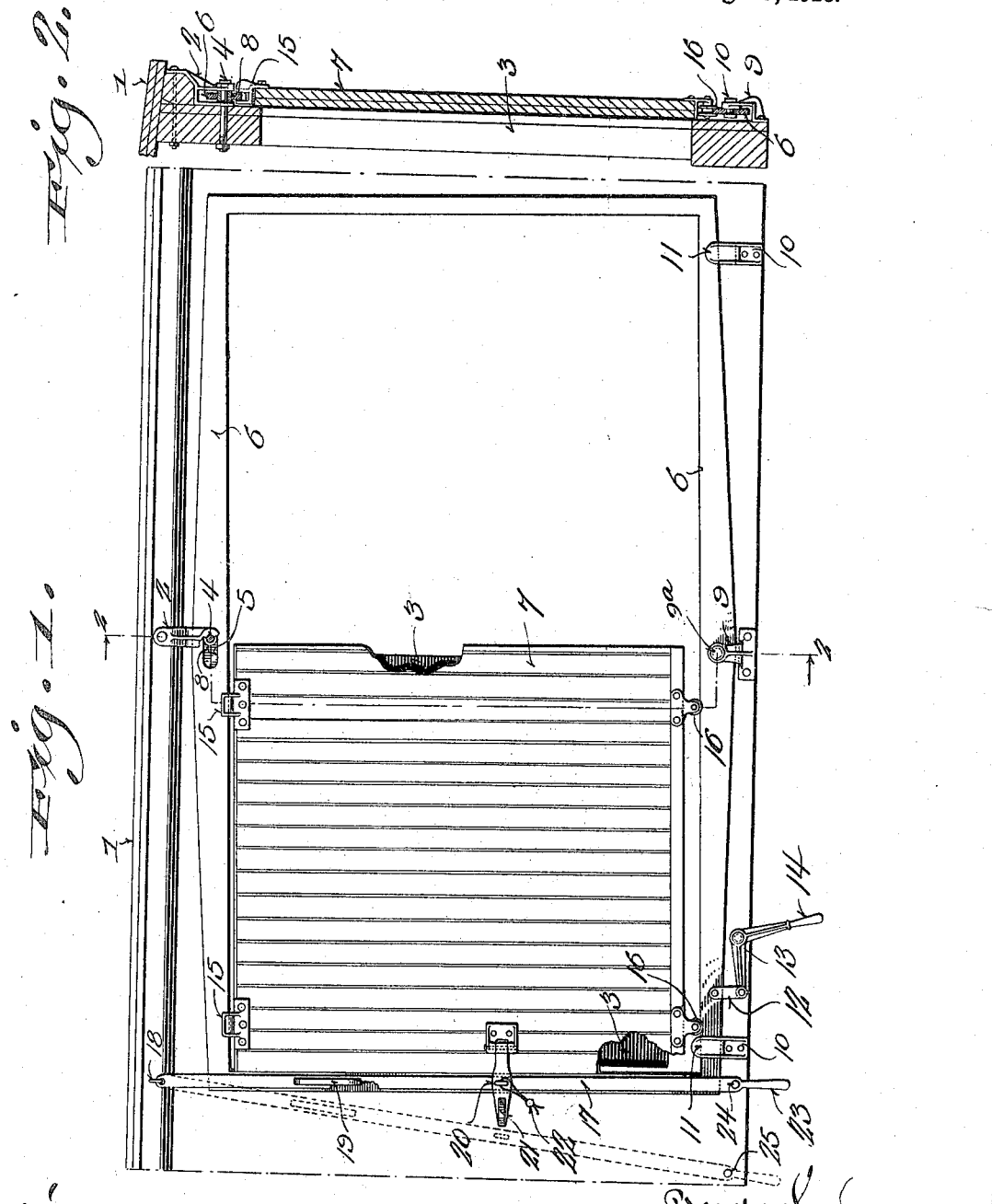

UNITED STATES PATENT OFFICE.

FRANK J. VICKMAN, OF WALSH, WISCONSIN.

CAR-DOOR OPERATOR.

1,194,578.                    Specification of Letters Patent.        Patented Aug. 15, 1916.

Application filed July 17, 1915.   Serial No. 40,454.

*To all whom it may concern:*

Be it known that I, FRANK J. VICKMAN, a citizen of the United States, and resident of Walsh, in the county of Marinette and State of Wisconsin, have invented certain new and useful Improvements in Car-Door Operators; and I do hereby declare that the following is a full, clear, and exact description thereof.

This invention relates to the subject of car doors, and has particularly in view novel means whereby a car door may be opened or closed.

The invention contemplates in its general organization a car door supporting frame that is carried by a car door-way, the frame having a door slidably mounted so that when rocked in one direction, the door will automatically slide to an open position, and when rocked in an opposite direction, the door will slide to a closed position.

In addition to the foregoing, the invention contemplates the employment of manually operable means for manipulating the frame to open or close the door; means for locking the frame to prevent pivotal movements thereof, and means for locking the door to prevent sliding movements of the door.

Other advantages and objects of the invention will be apparent from the following detailed description, when taken in connection with the accompanying drawing.

Referring to the accompanying drawing Figure 1, is a side view of a portion of a car equipped with the improved door. Fig. 2, is a vertical sectional view taken on the line 2—2, Fig. 1.

Referring to the accompanying drawing by numerals, 1 designates a portion of the side of a car to which the improved door and door operating mechanism are applied. A suitable hanger bracket 2 is carried by the car centrally above the door way 3, and supports the outer portion of a pivot bolt 4, extending through the side of the car. Bolt 4 extends through a longitudinal guide slot 5 in the upper member of a rectangular supporting frame 6 for the car door 7, the bolt forming the upper pivotal support for said frame, and being provided with a roller 8 that facilitates movements of the frame on said bolt. The lower portion of the car below the doorway 3, and in vertical alinement with the bolt 4, is equipped with an upstanding bracket 9, carrying a pivot 9ª upon which the lower portion of frame 6 is pivotally mounted. The described manner of mounting the frame 6 around the doorway 3 of a car, obviously permits said frame to be rocked vertically relatively to the doorway, such movements being facilitated through the slot 5 and the bolt 4. The frame 6 has one end disposed adjacent to the forward end of the doorway 3, and its other end projects well beyond the opposite end of the said doorway, and adjacent to each end, and below the said frame, the car is provided with a rest 10 equipped with an upstanding guide lip 11, that overlaps the base of said frame. The rests 10 are so disposed that they serve as supports for the lowered ends of the frame, and their lips 11 prevent lateral movements of said frame. Adjacent one end, the base of frame 6 carries a link 12 having a pivotal connection with one end of a bell-crank lever 13 carried by the car, the lever 13 being equipped with a handle 14. By means of the lever 13, and link 12 it will be apparent that the frame 6 may be readily rocked vertically, so that the ends of the said frame may be alternately elevated and lowered.

The upper and lower members of the frame 6 form tracks that are engaged by the embracing clip 15 carried by the upper edge portion of the door 7, and by the rollers 16 that are carried by the lower edge of the door, respectively.

A locking bar 17 is swiveled to, and suspended from a hook 18 carried by the upper portion of the car 1. At an intermediate point, the bar 17 is slotted for the reception of a holding loop 19 projecting outwardly from the frame 6, the arrangement being such that when the bar 17 and loop 19 are engaged, as shown in Fig. 1 of the drawing, the forward end of frame 6 is locked in a lowered position against pivotal movement. The bar 17 is also provided with a staple 20 adapted to be engaged by a hasp 21 hinged to the door 7, to lock the door in a closed position. A seal 22 may be employed to prevent accidental disengagement of the staple and hasp. At the lower end, bar 17 is provided with a manipulating handle 23, and with an opening 24 adjacent said handle for engaging a pin 25 carried by the car, and located beyond the doorway 3, to hold the bar in an unlocked position.

Assuming the parts of the invention to be in the positions shown in Fig. 1 of the drawing, it will be seen that the forward end of the frame 6 is locked in a lowered position, and that the door 7 is closed and locked in such position by the staple 20, hasp 21, and seal 22. To open the door, the hasp 21 is released from the bar 17, and the said bar released from the frame 6, and swung to the position shown by dotted lines, where it is engaged with the pin 25. Lever 13 is then rocked to cause link 12 to elevate the forward end of frame 6, whereby the door 7 will gravitate to the lowered rear end of frame 6, thereby uncovering the doorway 3. A reverse operation of lever 13 will cause door 7 to gravitate to its closed position, whereupon locking bar 17 is engaged with the frame 6, and the door 7 locked to said bar, in the manner described.

From the foregoing description, it will be understood that this invention provides simple means whereby the car door may be quickly opened or closed by an authorized person, and that the controlling parts of the mechanism for operating the door are conveniently disposed so they may be readily manipulated by a person on the road bed adjacent the car door.

I claim:

1. A door operating structure comprising the combination with a support of a rectangular vertically disposed supporting frame, means pivotally connecting the frame to said support, a door slidably mounted in the frame, a locking bar carried by the support for interlocking engagement with the frame, and locking means carried by the door for engaging the bar.

2. A door operating structure comprising the combination with a rectangular horizontally disposed supporting frame, means pivotally connecting the lower portion of the frame centrally of its ends to the support, the upper portion of the frame being provided with a centrally located longitudinal slot and a member projecting from the support and slidably engaged in said slot.

In testimony that I claim the foregoing I have hereunto set my hand at Marinette, in the county of Marinette and State of Wisconsin, in the presence of two witnesses.

FRANK J. VICKMAN.

Witnesses:
JOHN K. SETRIGHT,
ESTHER SETRIGHT.

Copies of this patent may be obtained for five cents each, by addressing the "Commissioner of Patents, Washington, D. C."